Patented May 8, 1934

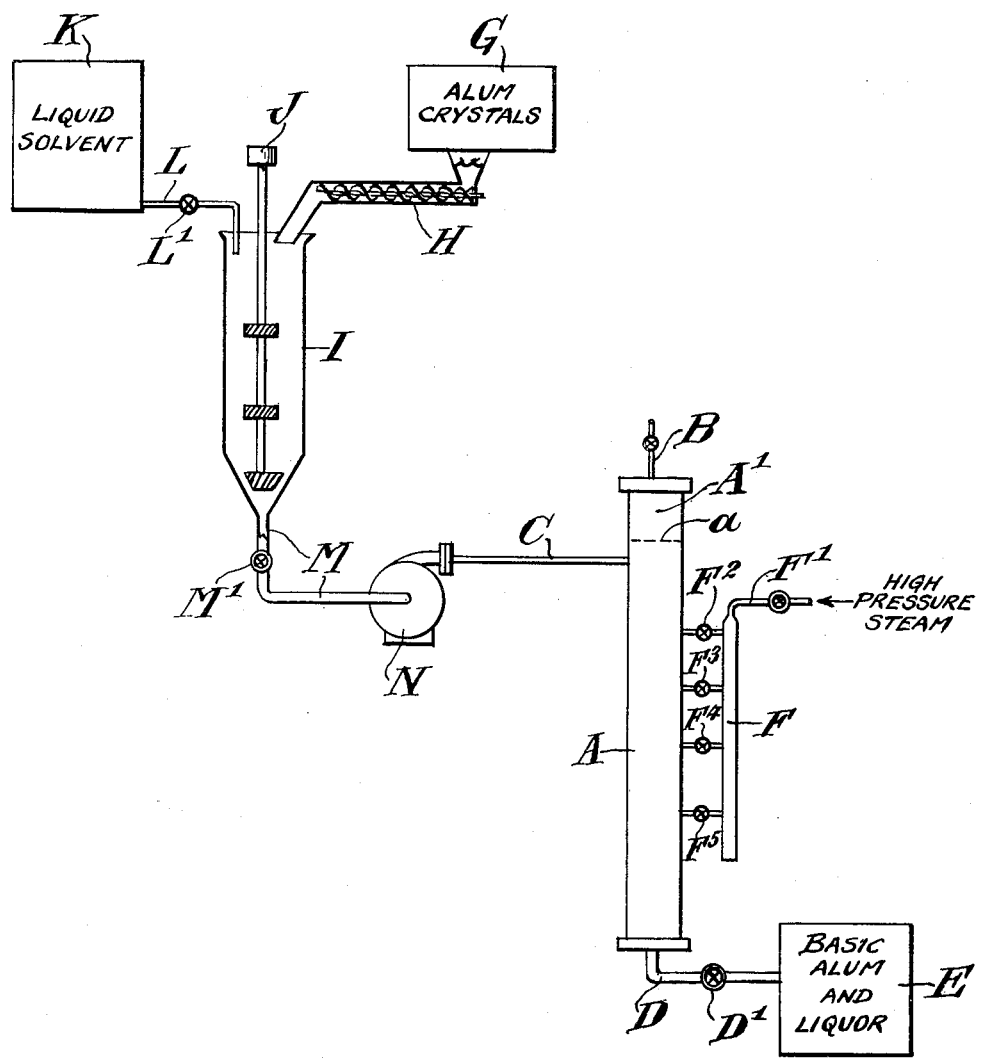

1,958,083

UNITED STATES PATENT OFFICE 1,958,083

METHOD OF CHARGING CONTINUOUS FLOW REACTION CONTAINERS WITH ALUM

Arthur Fleischer, Hartford, Conn., assignor to Kalunite Company, Philadelphia, Pa., a corporation of Delaware Application June 30, 1933, Serial No. 678,422

1 Claim. (Cl. 23—141)

My invention relates to a detail of the process in which a basic alum is produced by continuously charging an alum solution into one end of the conduit container, raising the temperature of the alum solution as it passes through the container by injection of high pressure steam to a temperature at or above 140° and preferably at 200° C. to effect the formation and precipitation of basic alum and the formation of a mother liquor and in which said mother liquor, together with the precipitate, is continuously drawn from the other end of the conduit container. Broadly speaking, the process is that described and claimed in the application of Gordon R. Steuart, Serial Number 606,786, filed April 22, 1932 and, with certain modifications, in the application of Gordon R. Steuart, Serial Number 606,787, filed April 22, 1932 now Patent Number 1,914,175 issued June 13, 1933. As heretofore practiced, the normal alum has been fed into the conduit container as a solution which has involved expense in bringing the alum crystals into solution and which, as it is desirable to feed the conduit container with fairly strong solutions, has required that the apparatus involving containers and pipes for the solution and the pump for forcing it into the conduit container should be maintained at comparatively high temperatures to avoid crystallization of the solution in these parts of the apparatus.

The object of my invention has been to provide a method for feeding the conduit container with normal alum largely or entirely in the form of small crystals suspended in a fluid solvent vehicle which may be either water or a solution of alum in water, alkali and/or ammonium sulphate solution or an aqueous alum solution, thus eliminating the necessity for bringing the alum into solution before it is charged into the conduit container and by using a solvent vehicle of sufficiently low concentration, avoiding the necessity of expensive heating appliances for preventing premature crystallization of alum from the solution in the alum reservoir, the pump and conduits connecting the reservoir and pump and the conduit leading to the conduit container and my invention consists accordingly in thoroughly mixing with the liquid solvent for alum small alum crystals so as to form a substantially fluid mixture and pumping said mixture directly into the conduit container in which it is, with great rapidity, raised to a temperature in which all of the alum is promptly brought into solution.

While the alum crystals can be mixed with water and the mixture pumped into the conduit container before any appreciable solution of the alum takes place in the water, I prefer to mix the alum crystals with a solution of alum in water which should be of a concentration which, at the temperatures to which the mixture is exposed prior to its delivery into the conduit container, should be of a concentration which will not result in any considerable crystallization of alum from the solution although a small amount of crystallization from the solution may be permitted in view of the fact that such crystallization of alum from the solution would take place upon the particles of alum suspended in the solution rather than upon the walls of the apparatus through which it is passed. It is preferred that water should be supplied to the conduit container in about equal weight to the alum simultaneously fed to the container. I have referred to the alum crystals to be mixed with the liquid solvent as small. It is necessary, of course, that the mixture of crystals and solvent should be thoroughly fluid and to assure this it is advisable that the mass of the crystals should be of a size of which the major portion will pass a ten mesh screen.

My invention will perhaps be better understood as described in connection with the drawing which is a diagrammatic view of an apparatus or plant adapted for use in the practice of my invention and in which A indicates a conduit container charged with alum solution up to a level indicated by the dotted line $a$. The upper portion of the conduit container, indicated at $A^1$, is charged with a high pressure gas, such as air, introduced through a pipe B from any source not shown of high pressure gas. C indicated a conduit through which a fluid suspension of alum crystals in a liquid solvent for alum is introduced into the conduit container. D indicates the outlet from the bottom of the container having, as shown, a valve $D^1$ and discharging into a receptacle, indicated at E. F indicates a steam manifold fed from a source of high pressure steam, not shown, through a pipe $F^1$ and from this manifold steam pipes, indicated at $F^2$, $F^3$, $F^4$ and $F^5$ lead into the conduit container.

To the extent above described the apparatus indicated is substantially the same as that shown in the drawings of the Steuart application, Serial Number 606,786. G indicates a reservoir for alum crystals. H a conveyor by which measured quantities of the alum crystals are fed to a mixing reservoir I, provided, as shown, with a stirrer J. K indicates a reservoir for a liquid alum solvent which may be either water or a solution of alum in water and L is a conduit provided with a regulating valve L¹ also leading into the mixing chamber I. M is a conduit leading from the mixing vessel I and provided with a valve M¹. This conduit leads to a pump N from which the conduit C leads into the upper part of the conduit container A, as indicated.

In operation, measured quantities of alum crystals and of the liquid vehicle drawn from the receptacle K are fed into the mixing vessel I, thoroughly mixed therein and the fluid mixture drawn therefrom and pumped into the conduit container by the pump N. High pressure steam is fed into the conduit container from the manifold F in sufficient quantity to promptly raise the temperature of the liquid mixture entering the conduit container to a temperature in excess of 140° C. preferably to 200° C., and at these temperatures a hydrolysis of the alum in solution occurs with the formation and precipitation of basic alum and the production of a mother liquor containing the sulphuric acid and alkali metal and/or ammonium sulphate not entering into the composition of the basic alum, together with some percentage of undecomposed normal alum and this mother liquor, together with the suspended particles of basic alum, are continuously drawn off through the conduit D at the base of the container.

As I have previously stated, the continuous process of producing basic alum from an alum solution, as above described, as well as the method of heating the alum solution by live steam injected into it, form the subject matter of the Steuart application, Serial Number 606,786 and my invention consists in the described method of preparing and feeding a mixture of alum crystals and a liquid solvent into the conduit container to be thereafter processed by the Steuart method.

Having now described my invention, what I claim as new and desire to secure by Letters Patent, is:

In the method of producing a precipitate of basic alum in which a normal alum solution is continuously forced into one end of a conduit container, heated in said container to reactive temperatures at or above 140° C. by means of high pressure steam injected into the container and in which the reaction products of precipitated basic alum and mother liquor are continuously drawn from the other end of the conduit container, the improved method of charging the conduit container which consists in mixing small normal alum crystals with a liquid solvent and forcing said admixed alum crystals and solvent into the conduit container.

ARTHUR FLEISCHER.